United States Patent [19]

Jahnke

[11] Patent Number: 4,606,778
[45] Date of Patent: Aug. 19, 1986

[54] JOINING METHOD

[75] Inventor: Bernd Jahnke, Neckargemuend, Fed. Rep. of Germany

[73] Assignee: BBC Aktiengesellschaft Brown, Boveri & Cie, Baden, Switzerland

[21] Appl. No.: 665,293

[22] Filed: Oct. 26, 1984

[30] Foreign Application Priority Data

Nov. 3, 1983 [DE] Fed. Rep. of Germany ....... 3339751

[51] Int. Cl.$^4$ ................................................ C21D 8/00
[52] U.S. Cl. ........................... 148/11.5 N; 148/11.5 Q; 148/127; 148/12 R; 228/194
[58] Field of Search ................... 148/127, 131, 11.5 N, 148/11.5 Q, 12 R, 12.1, 14; 228/193–195; 29/156.8 H

[56] References Cited

U.S. PATENT DOCUMENTS 3,530,568 9/1970 Owezarski ............................ 228/194
3,680,197 8/1972 Blum ...................................... 29/487
3,798,748 3/1974 Holko .................................... 29/487

FOREIGN PATENT DOCUMENTS 90887 10/1983 European Pat. Off. ............ 228/195
81585 5/1983 Japan .

Primary Examiner—Christopher W. Brody
Attorney, Agent, or Firm—Herbert L. Lerner; Laurence A. Greenberg

[57] ABSTRACT

The invention relates to a joining method for the production of a component from two or more constructional elements which are manufactured from a highly distortion-resistant metallic material, in particular a material based on nickel or iron. The constructional elements and the interlayer are manufactured from an oxide dispersion-hardened material, and are joined together with insertion of the interlayer to give the component. The interlayer is in an unrecrystallized fine-grained plastic state before the joining process, and undergoes recrystallization, as a result of heat treatment, only after the joining process, which is carried out at a temperature of 800 to 1,100 degrees centigrade and under a pressure of 1 to 200 Mpa.

15 Claims, 4 Drawing Figures

JOINING METHOD

BACKGROUND OF THE INVENTION

1. Field of the Invention

The invention relates to a welding method for producing a component from two or more constructional elements made of a metallic material, in particular of an oxide dispersion-hardened alloy based on nickel or iron, and with insertion of a metallic interlayer are joined together.

2. Description of the Prior Art

Such a method is used in particular in the manufacture of components produced from oxide dispersion-hardened alloys. Rotor and stator blades and gas turbine segments in which there is a build-up of heat can be manufactured from these alloys.

The formation of components from an oxide dispersion-hardened alloy begins with the production of the alloy-forming powder. The metals or metal compounds used in producing the powder are alloyed mechanically in a high-energy mill. From the powder obtained in this manner, blanks are first produced by means of extrusion. These blanks are further processed to the final components by forging, rolling and/or machining.

The special feature of these oxide dispersion-hardened alloys, in addition to the oxide dispersion and possible $\gamma$-precipitation, is an oriented grain structure which results from recrystallization. However, a disadvantage of this is that components cannot be case from the alloy and joined together using the conventional fusion welding method. Components which are to have, for example, flow-through channels in their center must be manufactured from at least two constructional elements. Before they are joined together, these constructional elements are provided with depressions, in particular by forging and, after the two halves have been joined together, these depressions form the desired channels which are required to the passage of cooling liquids. Firmly bonding the constructional elements to give such a component is not completely without difficulty.

Joining together constructional elements of dispersion-hardened materials still in their finely divided state by means of diffusion welding to give the desired component has been described. Diffusion welding is carried out using parameters with which the formation of coarse grains is avoided and the energy for subsequent recrystallization is retained. Any oriented recrystallization which takes place over the temperature gradient beyond the joined surface occurs after welding. The disadvantage of this method is the high plasticity of the components, since these are not yet in the recrystallized form when the diffusion welding is carried out. As a result of the pressure required for diffusion welding, it is very difficult to leave the cooling channels in an undeformed state in the center of the component to be formed. Additional measures have to be taken in order to retain the shape of these cooling channels during the diffusion welding. To date, it has not been possible to carry out joining in an economical and well-defined way without undesirable deformation of these channels. On the other hand, it is also impossible to solder inserts into the depressions suitable for preventing deformation of the depressions during diffusion welding, since all soldering processes which are carried out at below 1,000° C. result in remelting during recrystallization annealing.

Furthermore, it is known that components made of oxide dispersion-hardened alloys can be joined, after recrystallization, using a high-temperature solder. However, this method does not give a completely integrated weld seam, so that the soldered area constitutes a weak point with poorer mechanical properties.

SUMMARY OF THE INVENTION

An object of the invention is to provide a joining method by means of which constructional elements of oxide dispersionhardened alloys can be joined to form a component while avoiding during joining, deformation of the cooling channels formed by the combination.

With the foregoing and other objects in view, there is provided in accordance with the invention a joining method for producing a component from two or more constructional elements made of a metallic material, in particular of an oxide-dispersion-hardened alloy based on nickel or iron, which comprises; heat-treating the constructional elements before being joined to produce a coarse-grained oriented structure, after heat-treating inserting a metallic interlayer having a plastic fine-grained recrystallizable structure between the surfaces of the two constructional elements to be joined, joining the assembly of constructional elements with the inserted interlayer by heating under pressure to effect deformation of the interlayer with a fine-grain growth below 1 $\mu$m, and subjecting the resultant component formed from the constructional elements with the interlayer to a heat-treatment to effect oriented recrystallization.

Other features which are considered as characteristic for the invention are set forth in the appended claims.

Although the invention is illustrated and described herein as embodied in a joining method, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which the figures are as follows.

DETAILED DESCRIPTION OF THE INVENTION

Figure 1:
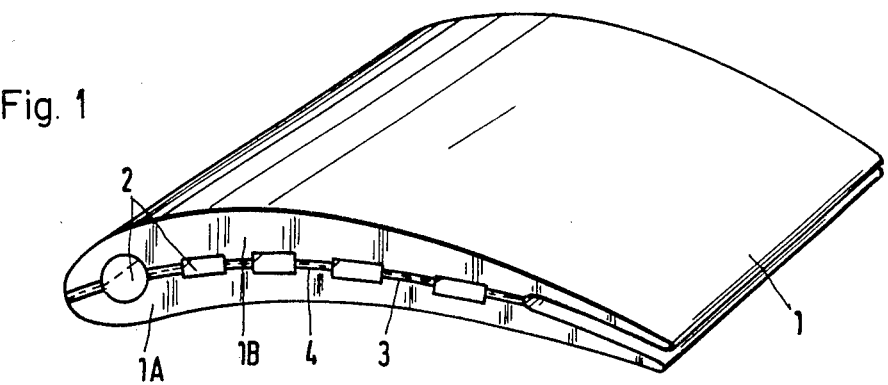
FIG. 1: A vertical section through a component of a gas turbine.

In accordance with the invention, the constructional elements to be joined for the production of the desired component are completely prefabricated. They have been processed to such an extent that they have their final shape. If the component to be manufactured is to have cooling channels at its center, appropriate depressions should be produced in the constructional elements to be joined, so that the desired cooling channels are formed by joining the constructional elements. The constructional elements forming the component have already been heat-treated; in particular, they have been subjected to the recrystallization process required for achieving oxide dispersion hardening, so that their material has a coarse-grained oriented structure. If it should prove necessary, metal sheets may then be soldered into the depressions of these constructional elements. The surfaces of the constructional elements to be joined together during the joining process can, before joining, be polished or provided with a rough structure.

The surfaces of the constructional elements are not joined together directly; instead, an interlayer is disposed between the surfaces to be joined. The interlayer is manufactured from the same material as the constructional elements to be joined together. In contrast to the constructional elements, however, this interlayer has not yet been heat-treated, i.e. its material is still fine-grained, unrecrystallized and therefore plastic. The thickness of the interlayer is chosen so that, after the two constructional elements have been joined together, there are at least 1 to 2 grain diameters of the recrystallized material in the transverse direction. When the interlayer is produced, particularly when the blank which constitutes the interlayer is extruded, care is taken to ensure that the interlayer has the same extrusion direction as the elements to be joined. In accordance with the invention, the surfaces of the constructional elements to be joined together via the interlayer can also be designed so that, after the joining procedure and during the recrystallization of the interlayer, they act as nucleating agents for the grains forming in the interlayer. Surfaces having saw tooth-like structures which press into the plastic interlayer are particularly suitable for this purpose. In this way, the recrystallized structure without a distinguishable joining zone is formed.

The welding, in particular the joining together of the surfaces via the interlayer, is carried out at a temperature which is somewhat below or only slightly above the recrystallization temperature of the interlayer. In particular, the welding temperature chosen is between 800 degrees centigrade and 1,100 degrees centigrade. The joining pressure and the deformation rate are chosen sufficiently large that deformation of the surfaces to be joined takes place and complete contact between these surfaces is achieved. The deformation rate can be influenced by appropriate choice of the pressure stamp speed. The pressure used for joining is preferably 1 to 200 Mpa. If required, a higher pressure may be chosen. By choosing the joining temperature between 800 and 1,100 degrees centigrade and appropriately selecting the deformation rate, one can prevent recrystallization of the metallic material forming the interlayer from taking place before the surfaces to be joined are completely in contact. The special choice of the pressure described above and of the corresponding temperature has the effect of retaining the texture required for recrystallization of the interlayer.

After the constructional elements to be combined have been joined, the resulting component is cooled at a predetermined rate. Directly thereafter, it is heated very rapidly to the recrystallization temperature of the interlayer, or above this temperature. Preferably, the component is heated to the solution annealing temperature of the interlayer. As a result of this heat treatment, recrystallization takes place over the joint area, and a completely recrystallized joint area without a joining zone results. Growth of the crystals in the interlayer takes place preferentially in the plane of the joining zone, since, in accordance with the invention, the extrusion direction of the interlayer corresponds to the longitudinal direction of the grains of the elements to be joined. To achieve this, it is necessary for the constructional elements to be joined together and the interlayer to have the same extrusion direction. In the joining method according to the invention, particularly as a results of the above choice of the deformation rate, of the temperature and of the pressure, no fine-grain growth above 1 $\mu$m takes place in the joining zone during the joining procedure.

The heat treatment of the constructional elements to be joined together by the joining method can also be carried out by means of zone recrystallization. The latter is preferably carried out using a steep temperature gradient.

In accordance with the invention, cooling the component produced by the joining method can be dispensed with. In this case, the component is heated rapidly, directly after the joining procedure, from the joining temperature to, or above, the recrystallization temperature, in particular the solution annealing temperature, such that recrystallization of the interlayer begins without intermediate cooling taking place.

The invention is illustrated below with reference to drawings.

FIG. 1 shows the component 1 of a gas turbine, this component coming into contact with the hot gas. It is made, in accordance with the invention, by combining two constructional elements 1A and 1B and an interlayer 3. The constructional elements 1A and 1B and the interlayer 3 are manufactured from an oxide dispersion-hardened alloy. In the embodiment shown here, the oxide dispersion-hardened metallic material used consists of 13 to 17% by weight of chromium, 2.5 to 6% by weight of aluminum, 2 to 4.24% by weight of titanium, 0.4 to 4.5% by weight of molybdenum, 3.75 to 6.25% by weight of tungsten, 0.1 to 3% by weight of tantalum, 0.02 to 0.5% by weight of zirconium, 0.01 to 0.02% by weight of boron, 0.02 to 2% by weight of yttrium oxide and nickel. The stated amounts by weight are based on the total weight of the alloy.

The constructional elements 1A and 1B and the interlayer 3 can also be produced from an alloy which is composed of 18 to 22% by weight of chromium, 0.02 to 1% by weight of titanium and 0.2 to 2% by weight of yttrium oxide, the remaining constituent of the alloy being nickel. For the manufacture of the constructional elements 1A and 1B and of the interlayer 3, one can also use a material which contains 18 to 22% by weight of chromium, 2 to 6% by weight of aluminum, 0.2 to 1% by weight of titanium and 0.2 to 1% by weight of yttrium oxide, the remaining constituent being iron. The stated weights of the two last-mentioned alloy compositions are based on the total weight of the alloy in each case.

In producing the constructional elements 1A and 1B and the interlayer 3, blanks (not shown here) are first manufactured from one of the alloys described above by extrusion. The constructional elements 1A and 1B shown in FIG. 2, and the interlayer 3 located between them, are produced from these blanks by forging, rolling and/or machining.

As shown in FIG. 1, the component 1 has at its center several cooling channels 2 running parallel to its longitudinal axis. Since the component 1 cannot be manufactured as an integral unit, in particular cannot be cast from the alloy, it has to be produced by joining together the constructional elements 1A and 1B described above, with insertion of the interlayer 3.

To form the cooling channels 2, the two elements 1A and 1B are provided with depressions 2A and 2B. These depressions 2A and 2B can be produced in the elements 1A and 1B by forging or milling.

Figure 2:
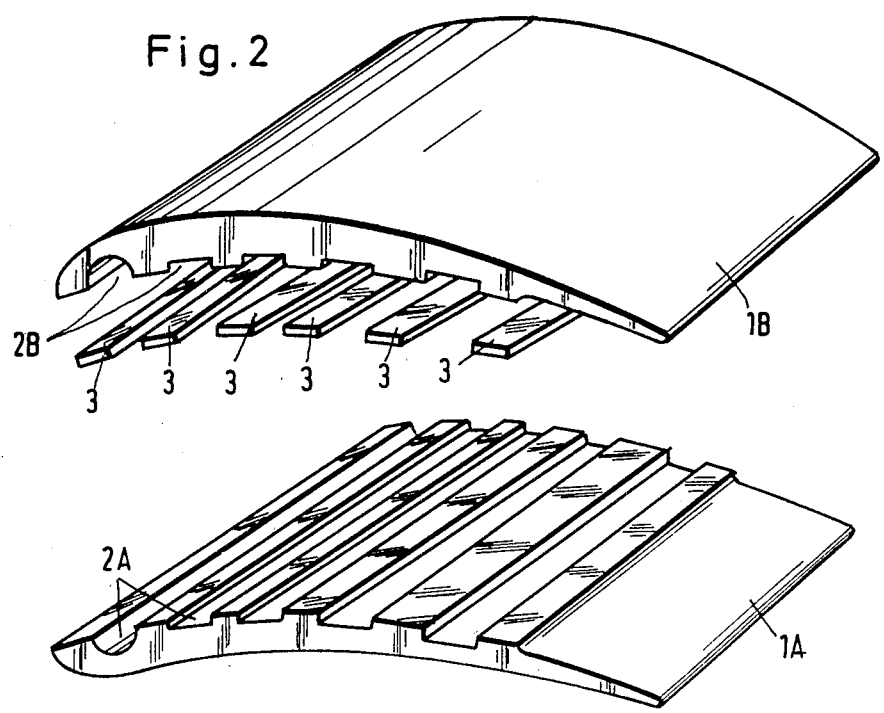
FIG. 2: the two constructional elements of recrystallized oxide dispersion-hardened materials, with the finely crystalline interlayer which has not yet been recrystallized.

The constructional elements 1A and 1B shown in FIG. 2 correspond exactly to the two halves of the component 1, formed when this component is separated along the direction of its longitudinal axis, without the interlayer 3, which is deformed after the welding procedure. After the depressions 2A and 2B have been milled in or forged in, the two constructional elements 1A and 1B are subjected to a heat treatment, in particular a recrystallization process. The surfaces of the two constructional elements 1A and 1B, which are to be joined together to form the component 1 with insertion of the interlayer 3, are subjected to additional treatment before the joining procedure. In this context, it is possible for the surfaces to be polished or to be provided with a saw tooth structure. The surfaces are then joined together, with insertion of the interlayer 3. The interlayer 3 is then not yet in the recrystallized state. Its material is fine-grained and still plastic. In contrast, the material of the two construction elements 1A and 1B is already coarse-grained and substantially non-plastic. After the surfaces to be joined have been placed together, with insertion of the interlayer 3, the joining zone 4 or the entire component is subjected to a temperature between 800 and 1,100 degrees centigrade. At the same time, the joining zone 4 is subjected to a pressure of, preferably, 1 to 200 Mpa, with deformation of the interlayer 3 taking place in a defined manner. The temperature employed in the joining process is chosen so that no recrystallization takes place before the surfaces to be joined together have made intimate and uniform contact. Furthermore, the temperature chosen above and the pressure result in no fine-grain growth above 1 $\mu$m taking place in the interlayer 3.

After completion of the joining process, in which the interlayer 3 is deformed to such an extent that, along the entire joining zone 4, complete firm contact is achieved between the constructional elements 1A and 1B and the interlayer 3, the newly formed component 1 is subjected to a heat treatment. The component 1 can be subjected directly to this heat treatment or can first be cooled. In the latter case, after being cooled the component 1 is heated to the recrystallization temperature or above this temperature, in particular to the solution annealing temperature of the interlayer 3, to cause recrystallization to take place over the joining zone 4.

If the component manufactured from the constructional elements 1A and 1B is not cooled after the joining process is complete, the component can be heated rapidly from the joining temperature to the recrystallization temperature or above this temperature, in particular to the solution annealing temperature, so that in this case too recrystallization takes place over the joining zone 4. If the component 1 is not cooled, the pressure acting on the joining zone 4 is gradually reduced during heating of the component 1. The solution annealing temperature to which the component 1 is heated is maintained until the desired strength of the material in the joining zone 4 has been achieved as a result of the recrystallization.

The heat treatment of the component 1, in particular the heating of this component to the solution annealing temperature, is preferably carried out in a furnace designed for this purpose. Instead of the solution annealing, it is also possible to carry out zone recrystallization over a temperature gradient, the component 1 being moved through the temperature gradient at a defined velocity.

Figure 3:
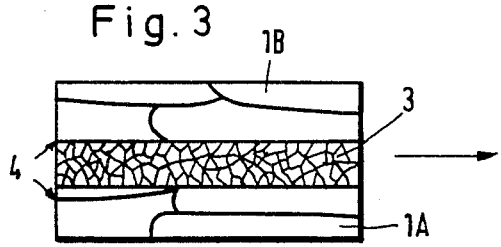
FIG. 3: a vertical section through the component in the region of the joining zone before recrystallization.

FIG. 3 shows the joining zone 4 of the component 1 before the recrystallization process.

Figure 4:
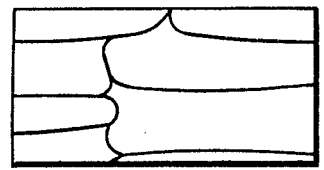
FIG. 4: a vertical section through the component in the region of the joining zone after recrystallication.

FIG. 4 shows the same area of component 1 with the joining zone 4 after the recrystallization process.

There are claimed:

1. A joining method for producing a component from two or more constructional elements made of a metallic material, in particular of an oxide dispersion-hardened alloy based on nickel or iron, which comprises; heat-treating the constructional elements before being joined to produce a coarse-grained oriented structure, inserting a metallic interlayer between the constructional elements which were heat-treated to produce a coarse-grained oriented structure to form a joining zone of interlayer with surfaces of the two constructional elements, said metallic interlayer manufactured from the same oxide disperison-hardened alloy as the constructional elements and having during joining the same extrusion direction as the constructional elements, and further having a plastic fine-grained recrystallizable structure, joining the assembly of heat-treated constructional elements having a coarse-grained, oriented structure with the inserted interlayer having a plastic fine-grained recrystallizable structure by heating at a temperature between 800°–1100° C. and a pressure of 1 through 200 Pa to effect deformation with a fine-grained growth of the interlayer below 1 $\mu$m, and subjecting the resultant component formed from the constructional elements to a heat treatment to effect oriented recrystallization over the joining zone.

2. A method as claimed in claim 1, wherein said resultant component is cooled and subsequently subjected to said heat treatment to effect oriented recrystallization.

3. A method as claimed in claim 1, wherein the dimension of the interlayer is chosen sufficiently large for it to have, before recrystallization, a thickness of at least 1 to 2 grain diameters of the recrystallized material in the transverse direction.

4. A method as claimed in claim 2, wherein the surfaces of the constructional elements to be joined are polished before inserting the interlayer between the constructional elements.

5. A method as claimed in claim 1, wherein the surfaces of the constructional elements to be joined are provided with a rough saw tooth-like structure.

6. A method as claimed in claim 1, wherein after complete contact between the surfaces to be joined has been achieved, the component is cooled and then heated to at least the recrystallization temperature to cause recrystallization to take place over the joining zone.

7. A method as claimed in claim 6, wherein the component is heated to the solution annealing temperature of the intermediate layer.

8. A method as claimed in claim 3, wherein after complete contact between the surfaces to be joined has been achieved, the component is cooled and then heated to at least the recrystallization temperature to cause recrystallization to take place over the joining zone.

9. A method as claimed in claim 4, wherein after complete contact between the surfaces to be joined has been achieved, the component is cooled and then heated to at least the recrystallization temperature to cause recrystallization to take place over the joining zone.

10. A method as claimed in claim 5, wherein after complete contact between the surfaces to be joined has been achieved, the component is heated rapidly from the joining temperature to at least the recrystallization temperature to cause recrystallization to take place over the joining zone.

11. A method as claimed in claim 9, wherein the component is heated to the solution annealing temperature of the intermediate layer.

12. A method as claimed in claim 10, wherein the component is heated to the solution annealing temperature of the intermediate layer.

13. A method as claimed in claim 11, wherein the component is kept at the solution annealing temperature until the recrystallization over a weld seam at the joint reaches a desired strength of the metallized material in the joining zones.

14. A method as claimed in claim 12, wherein the component is kept at the solution annealing temperature until the recrystallization over a weld seam at the joint reaches a desired strength of the metallized material in the joining zones.

15. A method as claimed in claim 1, wherein the component is subjected to zone annealing to achieve recrystallization of the interlayer, and the zone annealing is carried out under a steep temperature gradient.

* * * * *